3,275,641
**4-ACYLOXY-4-ARYL-1-(ARYLAMINOALKYL)
PIPERIDINES AND THEIR PREPARATION**
Philip M. Carabateas, Schodack, N.Y., assignor to Sterling Drug Inc., New York, N.Y., a corporation of Delaware
No Drawing. Filed Feb. 27, 1961, Ser. No. 91,606
3 Claims. (Cl. 260—294)

This invention relates to compositions of matter known in the art of chemistry as substituted-piperidines and to a process for making such compositions.

Piperidines having a wide variety of aryl and lower-acyloxy or lower-carbalkoxy substituents attached to the 4-position carbon atom of the piperidine ring are known in the art. Such substituted-piperidines are also known in which one or more lower-aliphatic hydrocarbon radicals are attached to other carbon atoms of the piperidine ring. Piperidines so substituted are known having various radicals attached to the nitrogen atom of the piperidine ring, such as lower-alkyl, aralkyl, aralkenyl, aryloxy-alkyl and arylmercaptoalkyl. Also known are 4-aryl-4-(lower-carbalkoxy)-piperidines having a 1-[(lower-arylamino)-(polycarbon-lower-alkyl)] radical attached to the nitrogen atom of the piperidine ring.

The invention sought to be patented, in its composition aspect is described as residing in the concept of a molecular structure in which a phenylaminoethyl substituent is attached to the nitrogen atom (or 1-position) of a 4-propionoxy-4-phenyl-piperidine.

In its process aspect, the invention sought to be patented is described as residing in the concept of reacting 1-[N-(lower - aryl)trifluoroacetamido - (polycarbon - lower-alkyl)]-4-(lower-aryl)-4-piperidinol with a lower-acylating agent and then reacting the resulting 4-(lower-acyloxy) - 4 - (lower - aryl) - 1 - [N - (lower - aryl)-trifluoroacetamido - (polycarbon - lower - alkyl)] - piperidiene with an alkaline agent in a lower alkanol solvent or in a mixture of a lower-alkanol and water to remove the trifluoroacetyl group. In the first step an acyl anhydride or acyl halide is preferably used as the lower-acylating agent. When acyl is lower-alkanoyl and a lower-alkanoyl anhydride is used as the acylating agent, the reaction is carried out preferably by heating the anhydride and the intermediate 4-(lower-aryl)-1-[N-(lower-aryl)trifluoroacetamido - (polycarbon - lower - alkyl)]-4-piperidinol preferably with but optionally without an inert solvent such as benzene, toluene or pyridine. While the reaction was found to proceed rapidly by heating the reactants on a steam bath, other temperatures in the range of about 70 to 150° C. can be used. Alternatively, the acylation can be carried out by reacting an acyl halide, e.g. an alkanoyl chloride, with the 4-(lower-aryl)-1 - [N - (lower - aryl) - trifluoroacetamido-(polycarbon-lower-alkyl)]-4-piperidinol preferably at room temperature, i.e., about 20–25° C., preferably in a dry solvent inert under the conditions of the reaction, e.g., chloroform; alternatively, the reaction with the acyl halide can be carried out using higher temperatures, e.g., 50–70° C.

The second step, i.e., the hydrolysis to remove the trifluoroacetyl moiety, was carried out conveniently by reacting the 4-(lower-acyloxy)-4-lower-aryl)-1-[N-(lower-aryl)trifluoroacetamido - (polycarbon - lower - alkyl)]-piperidine with ammonia as the alkaline agent in an aqueous methanol reaction medium. The reaction can be carried out using in place of ammonia other alkaline agents, e.g., sodium hydroxide, potassium hydroxide, lithium hydroxide, potassium carbonate, sodium carbonate, and using in place of methanol other lower alkanols, e.g., ethanol, isopropyl alcohol. Alternatively, removal of the trifluoroacetyl moiety can be effected by passing an aqueous alcohol solution of the 4-(lower-acyloxy)-4-(lower - aryl) - 1 - [N - (lower - aryl)trifluoroacetamido-(polycarbon-lower-alkyl)]piperidine through a basic ion exchange resin.

The invention, in its intermediate composition aspect, is described as residing in the concept of a composition having a molecular structure in which an N-(lower-aryl)-trifluoroacetamido-(polycarbon-lower-alkyl) substituent is attached to the 1-position of 4-(lower-aryl)-4-piperidinols and the above-described corresponding 4-(lower-acyloxy) derivatives. The intermediate 4-piperidinol embodiments are prepared either by reacting trifluoroacetic anhydride with a 4-(lower-aryl)-1-[(lower-aryl)amino-(polycarbon-lower-alkyl)]-4-piperidinol or by reacting a 4-(lower-aryl) - 4 - piperidinol with an N - (lower - aryl)trifluoro-acetamido-(polycarbon-lower-alkyl) halide. These reactions are illustrated hereinbelow.

The physical embodiments of the invention, both intermediates and final products, are white, crystalline solids, slightly soluble in water in the form of acid-addition salts and soluble in ethyl alcohol. The final products possess the inherent applied use characteristics of exerting a pronounced analgesic effect in animal organisms, as evidenced by pharmacological evaluation in rats according to standard test procedures.

The foregoing is a general description of the manner and process of making and using the invention so as to enable any persons skilled in the art of chemistry to make and use the same.

The molecular structures of the compounds of the invention are established by their mode of synthesis and corroborated by the correspondence of calculated and found values for the elementary analyses for representative examples.

The best mode contemplated by the inventor of carrying out his invention will now be set forth, as follows:

Add 25 g. of trifluoroacetic anhydride to 28.1 g. of 2-phenylaminoethyl bromide hydrobromide and reflux gently for one hour the resulting mixture. Allow the reaction mixture to cool and stand overnight at room temperature. Take up the reaction mixture with chloroform and wash the chloroform solution successively with water, aqueous sodium bicarbonate solution, dilute aqueous hydrochloric acid and water. Dry the chloroform solution over anhydrous sodium sulfate and concentrate it in vacuo to remove the chloroform. Distill in vacuo the residual oily material to obtain 17.5 g. of N-(2-bromoethyl)trifluoroacetanilide, boiling point 89–95° C. at 0.55 mm.

*Analysis.*—Calcd. for $C_{10}H_9BrF_3NO$: Br, 27.00. Found: Br, 27.61.

Reflux for about 22 hours a mixture containing 16.7 g. of N-(2-bromoethyl)trifluoroacetanilide, 10.0 g. of 4-phenyl-4-piperidinol, 15 cc. of triethylamine and 100 cc. of chloroform. Remove the solvent by distilling in vacuo to yield a semi-solid material and take this up in ethyl acetate and filter. Concentrate the filtrate by distilling off the ethyl acete in vacuo to yield 5.9 g. of red oily material containing 1 - (2 - N - phenyltrifluoroacetamido-ethyl)-4-phenyl-4-piperidinol. Without further purifying, heat this oil with 40 cc. of propionic anhydride and 0.5 cc. of pyridine for 6 hours. Pour the reaction mixture into 500 cc. of methanol, concentrate by distilling in vacuo to yield an oil and take up the oil in ether. Wash the ether solution first with aqueous sodium carbonate solution and then with water. Remove the ether by distilling in vacuo, add benzene to the remaining oily material and remove the benzene by distilling in vacuo to dry the oil. Dissolve the oil in dry ether, filter and to the filtrate add a solution of hydrogen chloride in ether to obtain a gummy precipitate. This precipitate, 4-phenyl-1 - (2 - N - phenyltrifluoroacetamidoethyl) - 4 - propionoxypiperidine, is used in the next step without further purification.

Dissolve said 4 - phenyl - 1 - (2 - N - phenyltrifluoroacetamidoethyl) - 4 - propionoxypiperidine in 250 cc. of methanol and add to this solution 15 cc. of 20% aqueous ammonia and allow the resulting mixture to stand for 1 hour. Concentrate the reaction mixture to a volume of about 75 cc., add about 125 cc. of water and extract the aqueous mixture with ether. Wash the ether solution with water, concentrate it in vacuo to remove the ether and dry the remaining oily material azeotropically with benzene. Dissolve the oil in ether and to this solution add a solution of hydrogen chloride in ether. Recrystallize the resulting precipitate successively from ehanol, ethanol-ether using decolorizing charcoal, ethanol, acetonitrile-ether and finally from ethanol to obtain 1.2 g. of the product, 4 - phenyl-1-(2-phenylaminoethyl)-4-propionoxypiperidine in the form of its dihydrochloride, M.P. 173.8–175.0° C. (corr.).

*Analysis.*—Calcd. for $C_{22}H_{28}N_2O_2 \cdot 2HCl$: C, 62.11; H, 7.11; Cl, 16.69. Found: C, 62.11; H, 6.75; Cl, 16.54.

This same compound is obtained using the following sequence of reactions starting with 4-phenyl-1-(2-phenylaminoethyl)-4-piperidinol, a compound disclosed in my copending patent application Serial Number 12,909, filed March 7, 1960: Combine 3.5 g. of 4-phenyl-1-(2-phenylaminoethyl)-4-piperidinol, 2.0 cc. of triethylamine and 25 cc. of chloroform and cool this mixture to about 5° C. Add to the cooled mixture a solution of 2.52 g. of trifluoroacetic anhydride in 5 cc. of chloroform, keeping the reaction mixture at about 5 to 10° C. Allow this mixture to stand for about 24 hours to yield a solution containing 4-phenyl-1-(2 - N - phenyltrifluoroacetamidoethyl)-4-piperidinol, which was used directly in the next step without isolation. To said solution add 1 cc. of triethylamine; then add 2.22 g. of propionyl chloride in 5 cc. of chloroform; and allow the resulting reaction mixture to stand for 2 hours. Wash the reaction mixture twice with aqueous sodium carbonate solution and then with water. Dry the chloroform solution over anhydrous sodium sulfate, filter off the sodium sulfate, and concentrate the filtrate in vacuo to remove the chloroform thereby yielding an orange oil. Take up the oil in ether, filter the ether solution, and to the filtrate add a solution containing hydrogen chloride in ether. Separate the resulting white gummy precipitate by filtration. Use this gummy precipitate, 4-phenyl - 1 - (2 - N - phenyltrifluoroacetamidoethyl)-4-propionoxypiperidine hydrochloride, in the next step without further purification.

Dissolve the above gummy precipitate in 50 cc. of methanol and to this solution add 15 cc. of 28% aqueous ammonia. Allow this reaction mixture to stand for about 30 minutes, remove the methanol by distilling in vacuo and dilute the residual material to a volume of about 100 cc. with water. Extract the aqueous mixture with ether, wash the ether extract with water, concentrate the extract by distilling in vacuo, and dry the residual oily material azeotropically with benzene. Dissolve the oil in ether and to the ether solution add a solution of hydrogen chloride in ether. Boil the resulting white precipitate with ethyl acetate, and then recrystallize it from ethanol-ether to obtain the product, 4-phenyl-1-(2-phenylaminoethyl)-4-propionoxypiperidine in the form of its dihydrochloride, M.P. 173–174° C.

*Analysis.*—Calcd. for $C_{22}H_{28}N_2O_2 \cdot 2HCl$: C, 62.11; H, 7.11; Cl, 16.69. Found: C, 62.36; H, 6.96; Cl, 17.15.

To prepare this product in its free base form, dissolve the dihydrochloride salt in water, treat the solution with aqueous sodium hydroxide solution, extract the liberated basic product with benzene, dry the benzene extract over anhydrous sodium sulfate, and remove the benzene by distilling in vacuo.

Pharmacological evaluation of 4-phenyl-1-(2-phenylaminoethyl)-4-propionoxypiperidine dihydrochloride in aqueous solution administered to rats subcutaneously using the D'Amour-Smith method has shown that this compound is about thirteen hundred times as potent an analgesic as meperidine hydrochloride on a molar basis in terms of the bases.

The foregoing description of the invention is for purposes of illustration and does not limit the generality of the applicability of the inventive concept as herein set forth. Other 4-(lower-acyloxy)-4-(lower-aryl)-1-[(lower-arylamino)-(polycarbon-lower - alkyl)] - piperidines, including those having one or more lower-aliphatic hydrocarbon radicals attached to other carbon atoms of the piperidine ring, and their acid-addition salts can be prepared in the manner above-described by substituting the molar equivalent quantities of the desired 4-(lower-aryl)-1 - [N - (lower - aryl)trifluoroacetamido - (polycarbon-lower-alkyl)]-4-piperidinol and lower-acylating agent for the corresponding reactants in the examples and then reacting the resulting 4-(lower-acyloxy)-4-(lower-aryl)-1-[N - (lower -aryl)trifluoroacetamido - (polycarbon-lower-alkyl)]-piperidine with an alkaline agent, e.g., aqueous ammonia, to remove the trifluoroacetyl group by hydrolysis, and are regarded by the applicant as the full equivalents of the particular embodiments of the invention herein specifically described and claimed.

I claim:

1. A process for the preparation of 4-phenyl-1-(2-phenylaminoethyl)-4-propionoxypiperidine which comprises reacting 4-phenyl-1-(2-N-phenyltrifluoroacetamidoethyl)-4-propionoxypiperidine with aqueous ammonia.

2. 4 - phenyl - 1 - (2 - N - phenyltrifluoroacetamidoethyl)-4-propionoxypiperidine.

3. 4 - phenyl - 1 - (2 - N - phenyltrifluoroacetamidoethyl)-4-piperidinol.

References Cited by the Examiner

UNITED STATES PATENTS

| | | | |
|---|---|---|---|
| 2,784,192 | 3/1957 | Schmidle et al. | 260—294.3 |
| 2,824,875 | 2/1958 | Elpern | 260—294.3 |
| 2,846,437 | 8/1958 | Elpern | 260—294.3 |
| 2,850,500 | 9/1958 | Elpern | 260—294.3 |
| 2,880,211 | 3/1959 | Elpern | 260—294.3 |

OTHER REFERENCES

Braenden et al., "Bull. Wld. Hlth. Org.," vol. 13, page 962 (1955).

ALEX MAZEL, *Primary Examiner.*

IRVING MARCUS, DUVAL T. McCUTCHEN,
*Examiners.*

JOSE TOVAR, *Assistant Examiner.*